United States Patent [19]
Chanal et al.

[11] Patent Number: 5,722,554
[45] Date of Patent: *Mar. 3, 1998

[54] CLOSURE ELEMENT FOR CONFINING A PRODUCT IN A POT IN A TAMPERPROOF MANNER, AND METHOD FOR MANUFACTURING SUCH A CLOSURE ELEMENT

[75] Inventors: Cyrille Chanal, Charenton-le-Pont; Jacques Playe, Brunoy, both of France

[73] Assignee: L'Oreal, Paris, France

[*] Notice: The portion of the term of this patent subsequent to Sep. 16, 2014, has been disclaimed.

[21] Appl. No.: 698,760

[22] Filed: Aug. 16, 1996

Related U.S. Application Data

[63] Continuation of Ser. No. 306,976, Sep. 16, 1994, Pat. No. 5,573,130.

[30] Foreign Application Priority Data

Sep. 17, 1993 [FR] France ................... 93/11104

[51] Int. Cl.⁶ ......................................... B65D 45/32
[52] U.S. Cl. ................ 220/319; 220/212.5; 220/634; 220/793; 220/780; 215/274; 264/259; 264/274; 264/279
[58] Field of Search ................. 220/265, 266, 220/270, 276, 319, 212.5, 634, 780, 781, 787, 788, 789, 790, 793, 794, 796, 799, 800, 801, 802, 805; 215/349, 350, 274, 255, 254; 264/255, 259, 266, 271.1, 274, 279

[56] References Cited

U.S. PATENT DOCUMENTS

| | | | |
|---|---|---|---|
| 4,497,765 | 2/1985 | Wilde et al. | 264/274 X |
| 4,695,420 | 9/1987 | Grawey et al. | 264/279 X |
| 5,008,060 | 4/1991 | Kanai et al. | 264/274 X |
| 5,020,686 | 6/1991 | Dutt | 220/276 |
| 5,096,652 | 3/1992 | Uchiyama et al. | 264/259 X |
| 5,145,085 | 9/1992 | Yost | 220/276 X |
| 5,573,130 | 11/1996 | Chanal et al. | 220/212.5 |

*Primary Examiner*—Allan N. Shoap
*Assistant Examiner*—Nathan Newhouse
*Attorney, Agent, or Firm*—Staas & Halsey

[57] ABSTRACT

A closure element for a container equipped with a neck in order to confine a cosmetic product in a tamperproof manner. The closure element is produced by dual-injection molding of plastic and includes a ring non-removably fixed onto the neck, this ring being produced from a first plastic, and a disc forming a lid, produced from a second plastic, an edge of which is received in a groove formed in the ring. The two different plastic materials are incompatible so that no connection occurs between them by thermofusion. The disc is equipped with a tab to facilitate separation of the disc from the ring in order to open the container.

2 Claims, 2 Drawing Sheets

CLOSURE ELEMENT FOR CONFINING A PRODUCT IN A POT IN A TAMPERPROOF MANNER, AND METHOD FOR MANUFACTURING SUCH A CLOSURE ELEMENT

This application is a continuation of application Ser. No. 08/306,976, filed Sep. 16, 1994, now U.S. Pat. No. 5,573,130.

BACKGROUND OF THE INVENTION

The invention relates to a closure element for a pot equipped with a neck in order to confine a product, particularly a cosmetic product, in this pot in a tamperproof manner, the closure element being produced by dual-injection of plastic and including a fastening ring fixed onto the neck of the pot in a practically non-removable manner, this fastening ring being produced from a first plastic, and a disc, forming a lid, produced from a second plastic and connected to the fastening ring, this disc being equipped with a pull means, it being necessary to separate the disc from the fastening ring in order to open the pot.

There is known, for example from FR-A-2,617,756, a closure element of this type which is obtained by two successive injections, the conditions being chosen so that a connection becomes established by thermofusion in the zone of juxtaposition of the ring and of the disc, between the two materials of which these parts are composed.

Although this solution offers advantages, experience has shown that there was not really any control over the force of adhesion between ring and disc forming a lid, which leads to a significant spread in the forces required to tear the disc from the ring.

SUMMARY OF THE INVENTION

The object of the invention, above all, is to provide a closure element which meets the various practical requirements better than hitherto and which, especially, while continuing to ensure tamperproof closure, makes it possible to keep the force required to separate the disc from the ring within acceptable limits, on the occasion of first opening. Furthermore, it is desirable for this closure element to remain simple and economical to manufacture.

According to the invention, an element for closing a pot equipped with a neck, for confining a product, particularly a cosmetic product, in this pot in a tamperproof manner, of the sort defined previously, includes a ring and a disc which are produced from two different materials chosen to be incompatible so that no connection becomes established between them by thermofusion, and the ring is overmolded on the edge of the disc, which edge is trapped in an annular groove in the ring.

The connection between disc and ring is obtained not by thermofusion which is difficult to control, but by a connection by way of shape giving rise to smaller spreads as regards the force for tearing out the disc relative to the ring.

Advantageously, the two plastics used for the injection of the two components of the closure element include a polyethylene/polyacetate resin pairing, or polypropylene/polyethylene and Santoprene®/polyethylene pairings. Each of these materials may be used equally well for the ring or for the disc, the other material being used for the disc or for the ring. Santoprene® is the trade mark under which the "Monsanto" company markets a soft thermoplastic polymer made up by grafting EPDM onto polypropylene, EPDM being an elastomeric ethylene propylene diene terpolymer.

Preferably, the disc includes a flat central part and, on its periphery, a skirt capable of penetrating into the neck of the pot, the upper edge of this skirt including a collar-shaped extension situated in a plane substantially parallel to that of the disc, this collar being trapped in the groove of the ring during overmolding.

The disc is equipped, on its outer face, with a tab making it possible to exert a pulling force in order to open the pot. The ring includes on an upper internal border of the groove a radial projection towards the center, of limited angular extent, the position of this projection corresponding to that of the tab of the fitted disc.

The invention also relates to a method for manufacturing the closure element, wherein two plastics which are incompatible with each other as well as suitable molding conditions are chosen for the ring and the disc so that no connection by thermofusion is created. First of all the disc is injected, then the ring is overmolded on the edge of the disc which is engaged in a complementary annular groove in the ring.

BRIEF DESCRIPTION OF THE DRAWINGS

Apart from the provisions explained hereinabove, the invention includes of a certain number of other provisions which will be dealt with more fully hereafter with regard to one embodiment described with reference to the drawings appended hereto, but which is in no way limiting.

Finally.

DESCRIPTION OF THE PREFERRED EMBODIMENTS

Figure 1:
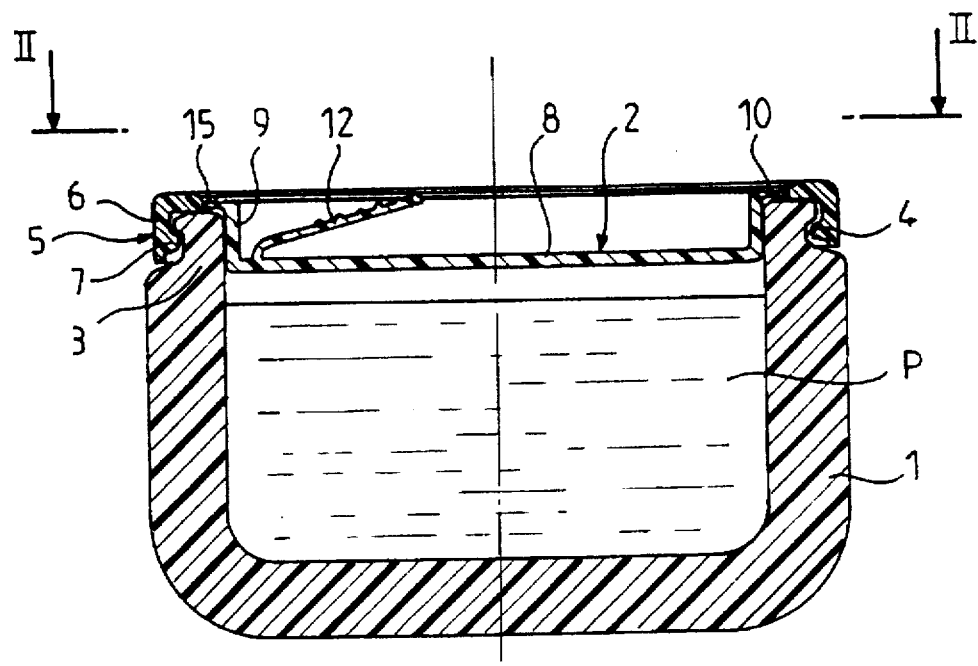
FIG. 1 of these drawings is a view in axial vertical section of a closure element according to the invention fixed to a pot of product.
Figure 2:
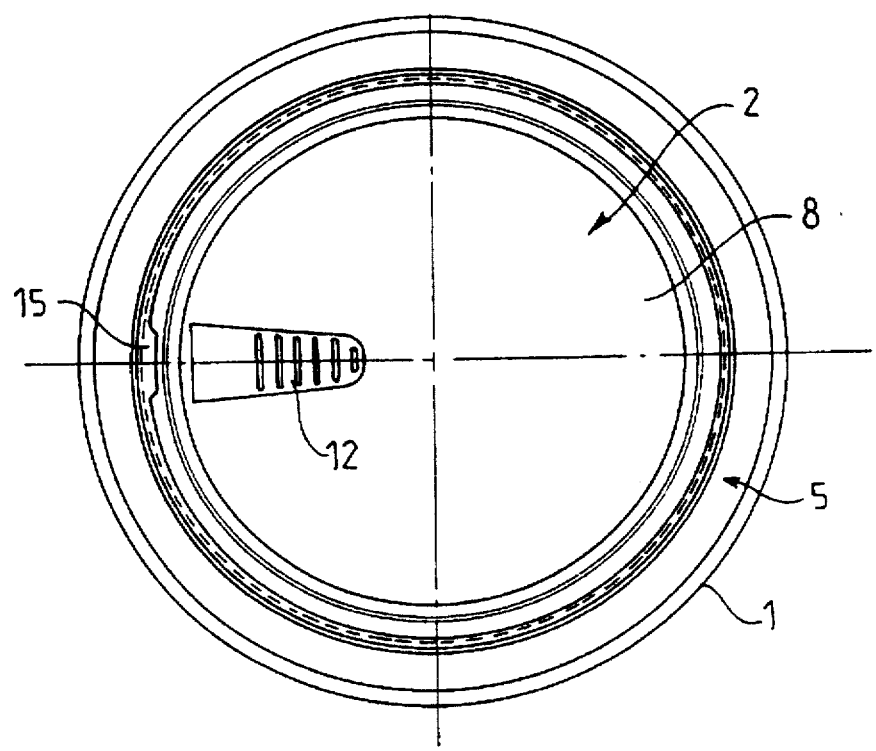
FIG. 2 is a plan view of the closure element.

Referring to the drawings, especially to FIGS. 1 and 2, there may be seen a cylindrical pot 1 with circular cross-section, for example made of glass, containing a cosmetic product such as a cream P and closed off by a closure element 2 capable of confining the product P in a tamperproof or almost tamperproof manner. The adjective "tamperproof" used here must be understood in the sense that the first opening of the pot 1 leads to a change in the appearance of the closure element so that it is immediately visible, thereafter, that the pot 1 has already been opened.

The pot 1 is equipped with a neck 3 of which the inside diameter, in the example in question, is identical to that of the rest of the pot 1. The neck 3 includes an annular peripheral groove 4 over its outer surface.

Figure 3:
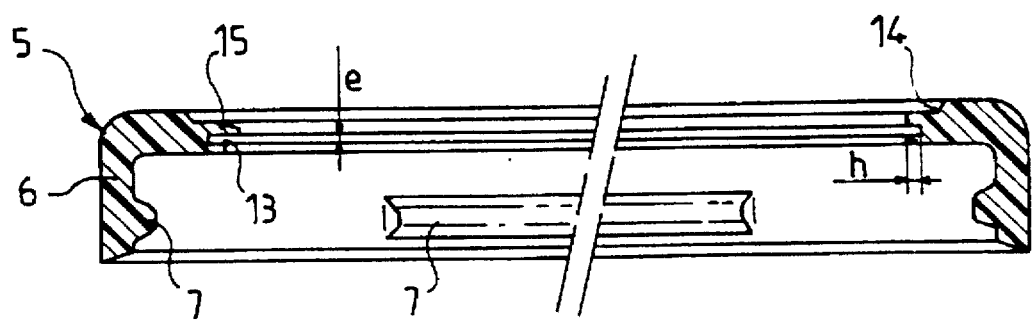
FIG. 3 is a detail in section on a larger scale of the ring alone.
Figure 4:
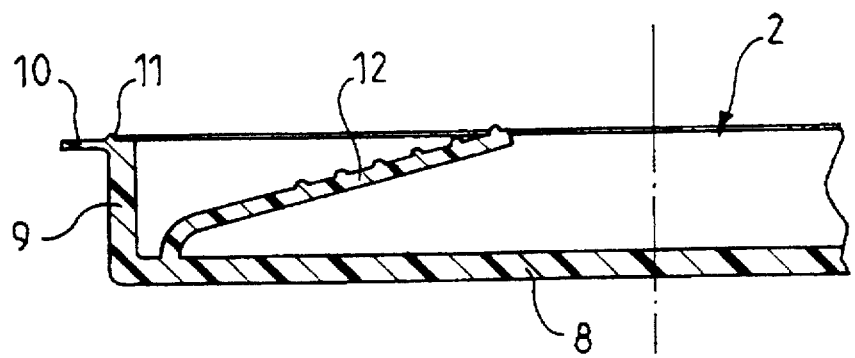
FIG. 4 is a detail in section on a larger scale of the disc.

The closure element 2 is produced by dual-injection of plastic. This element 2 includes a fastening ring 5 with a transverse section in the form of an inverted L exhibiting a cylindrical skirt 6 equipped with internal beads 7 capable of being fastened in the groove 4 by clipping in. This clipping-in is designed to be almost non-removable once it has been achieved. The beads 7 are not continuous, as visible in FIG. 3, but extend along evenly distributed circular arcs separated from one another by zones which do not have beads.

The element 2 further includes a disc 8 forming a lid, of which the mean plane is orthogonal to the axis of the pot 1. This disc 8 is injected from a different plastic than that of the ring 5.

Figure 5:
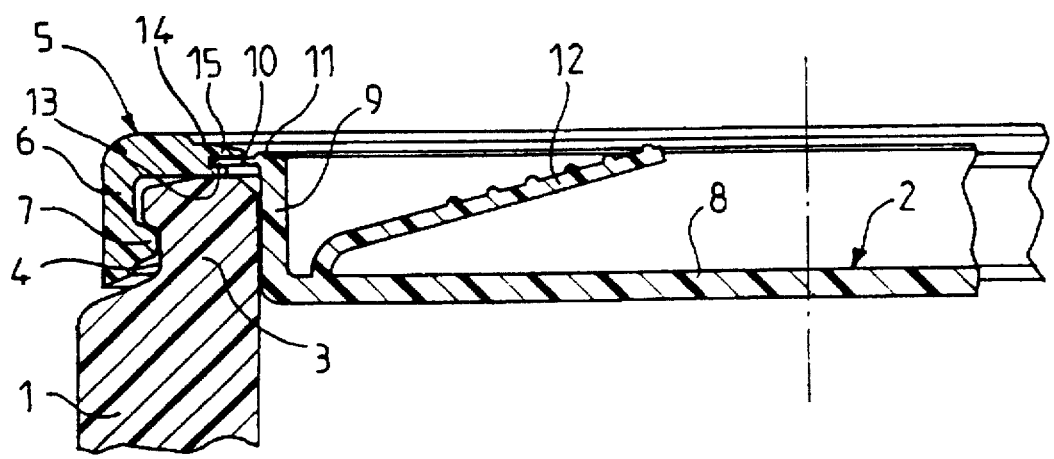
FIG. 5 is a detail in section on a larger scale of the assembly of the ring and of the disc mounted on the pot.

The disc 8, commonly termed "flat dish" is equipped on its edge with a cylindrical or frustoconical skirt 9 pointing upwards, as clearly visible in FIG. 5. The upper edge of the skirt 9 includes an extension 10 in the form of a collar, the plane of which is parallel to that of the actual disc, this collar 10 projecting radially outwards. A peripheral bead 11 is provided on the upper surface of the collar 10, substantially level with the outer surface of the skirt 9. This bead facilitates the stacking of a multitude of elements 2, facilitating industrial assembly.

A tab 12 for gripping, secured to the disc 8 and molded integrally with it, is provided on the upper surface of this disc in the vicinity of the skirt 9.

The two plastics of the disc 8 and of the ring 5 are chosen so as to be incompatible so that no connection becomes established between them by thermofusion.

The disc 8 is produced first by injection, then the ring 5 is overmolded over the edge formed by the collar 10, which becomes trapped in an annular groove 13 in the ring.

The mold for injection-moulding the ring 5 is designed so that the groove 13 has an axial thickness e (FIG. 3) and a radial depth h (FIG. 3) which are such that the closure produced by the element 2 fitted to the pot 1 is leaktight, although there is no connection between the disc 8 and the ring 5 by thermofusion. Furthermore, the assembly is designed so that the minimum force to be exerted to separate the disc 8 from the ring 5 is of the order of 1 daN.

As an example of a pairing of materials which can be used for the ring 5 and the disc 8, polyethylene/polyacetate resin, polypropylene/polyethylene, or even Santoprene®/polyethylene pairing are recommended. One of these materials is used for the disc 8 and the other material is used for the ring 5.

The overmolding of the ring 5 onto the disc 8 and the dimensions of the groove 13 are further designed so that after the disc 8 has been torn out and the collar 10 has been disengaged, this collar cannot be fitted back into the annular groove 13.

However, the disc 8 forming a lid may be placed over the ring 5 which has remained fastened to the neck 3, in order to afford the product P a certain degree of protection. Advantageously, the ring 5 includes on its upper surface an annular recess 14 open upwards capable of receiving the collar 10 placed on the bottom of this recess.

The ring 5 includes on its internal edge situated above the groove 13, a part 15 projecting radially inwards, of relatively small peripheral dimension, bounded by a straight edge. The upper surface of the projection 15 is inclined in the direction of the center of the ring 5. This projection 15 is located level with the tab 12 when the closure element 2 has not yet been opened. The projection 15 ensures that the ring 5 stays on the neck 3 of the pot when the disc 8 is torn out; further, it facilitates the repositioning of the flat dish 8 after use.

The invention therefore provides a closure element which makes it possible to protect the product P contained in the pot from the air effectively during storage, whilst assuring the user that this product has never been used beforehand, by virtue of the tamperproof nature of this closure element 2.

There is relatively good control over the force to be exerted to tear the disc 8 out on first opening, by virtue of the connection by way of shape established between the collar 10 of the disc 8 and the groove 13 in the ring 5. Leaktightness during storage is fully ensured.

We claim:

1. Closure element for a container equipped with a neck in order to confine a product in a tamperproof manner, the closure element comprising:

(a) a fastening ring substantially non-removably fixed to the neck of the container, this fastening ring being produced from a first plastic and including an annular groove; and (b) a cap produced from a second, different plastic to include a peripheral edge, wherein the edge of the cap is received in the annular groove formed in the ring, wherein the first and second plastics are incompatible so that no connection is formed between them by thermofusion, wherein the groove in the ring has dimensions including an axial thickness and a radial depth which are such that the closure produced by the element fitted on the container is leaktight, wherein the edge of the cap is separated from the groove of the ring in order to open the container, and wherein, after the edge is separated from the groove, the edge cannot be fitted back into the groove.

2. A method for manufacturing a closure element for a container equipped with a neck in order to confine a product in a tamperproof manner, comprising the following steps:

(a) injection molding a cap from a first plastic to include a peripheral edge;

(b) injection overmolding a ring from a second plastic onto the peripheral edge of the cap, thereby forming an annular groove in the ring which receives the complementary edge of the cap; and (c) substantially non-removably fixing the fastening ring to the neck of the container, wherein the first and second plastics are incompatible so that no connection is formed between them by thermofusion, wherein the groove in the ring has dimensions including an axial thickness and a radial depth which are such that the closure produced by the element fitted on the container is leaktight, wherein the edge of the cap is separated from the groove of the ring in order to open the container, and wherein, after the edge is separated from the groove, the edge cannot be fitted back into the groove.

* * * * *